United States Patent [19]
Cloud

[11] Patent Number: 5,136,525
[45] Date of Patent: Aug. 4, 1992

[54] METHOD AND APPARATUS FOR CARRYING OUT BOREHOLE TEMPERATURE MEASUREMENTS

[75] Inventor: Wayne B. Cloud, Carrollton, Tex.

[73] Assignee: Mobil Oil Corporation, Fairfax, Va.

[21] Appl. No.: 766,314

[22] Filed: Sep. 27, 1991

[51] Int. Cl.$^5$ .................. G01K 7/00; G01R 19/25; H03K 5/26

[52] U.S. Cl. .................. 364/550; 73/154; 364/557; 374/136; 374/170

[58] Field of Search ............ 374/136, 163; 73/154; 364/569

[56] References Cited

U.S. PATENT DOCUMENTS

| | | | |
|---|---|---|---|
| 3,068,447 | 12/1962 | Godbey. | |
| 3,309,656 | 3/1967 | Godbey. | |
| 3,807,227 | 4/1974 | Smith, Jr. | 73/154 |
| 4,258,421 | 3/1981 | Juhasz et al. | 364/424.04 |
| 4,743,121 | 5/1988 | Takagi et al. | 374/163 |
| 4,745,564 | 5/1988 | Tennes et al. | 364/566 X |
| 4,839,645 | 6/1989 | Lill | 340/870.17 |
| 5,085,526 | 2/1992 | Sawtell et al. | 374/170 X |

*Primary Examiner*—Daniel M. Yasich
*Attorney, Agent, or Firm*—Alexander J. McKillop; Charles J. Speciale; George W. Hager, Jr.

[57] ABSTRACT

A self-contained, programmable temperature sensor is positioned within a suitable pressure housing affixed to a borehole tool to record and store temperature data at predetermined times during operations of the borehole tool in a borehole penetrating a subsurface formation. The depth of the temperature sensor within the borehole corresponding to each temperature reading is recorded. After the borehole tool is removed from the borehole, the temperature sensor is removed from the pressure housing and the stored temperature data is retrieved for use in producing a record of borehole temperature versus depth within the borehole at the programmed times.

21 Claims, 2 Drawing Sheets

METHOD AND APPARATUS FOR CARRYING OUT BOREHOLE TEMPERATURE MEASUREMENTS

BACKGROUND OF THE INVENTION

In the drilling and completion of oil wells, gas wells and similar boreholes, it is frequently desirable to transmit data representative of various downhole conditions from a subsurface location to a surface location. In one borehole system, downhole measurements are transmitted by means of an electrical conductor or cable extending upward to the surface of the earth through the drill string (see U.S. Pat. No. 3,068,447 to J. K. Godbey). In another borehole system, a downhole measurement is transmitted uphole by means of an acoustic wave pasing upward through the drill string (see U.S. Pat. No. 2,810,546 to B. G. Eaton). In yet another borehole system, drilling mud within the borehole is utilized as the transmission medium for information-bearing acoustic waves (see U.S. Pat. No 3,309,656 to J. K. Godbey). An acoustic transmitter located downhole continuously interrupts the flow of drilling mud, thereby generating an acoustic signal in the drilling mud. The acoustic wave is modulated with the downhole measurement at the surface. At the surface the acoustic signal is detected and demodulated to provide the desired readout information.

Each of these borehole measurement transmission mediums can be disruptive to other borehole operations. It is, therefore, a specific object of the present invention to provide for a borehole temperature measuring method and apparatus, particularly for temperature, which overcomes the shortcomings of such downhole parameter measurement and data transmission techniques so as to be non-disruptive to other borehole operations.

SUMMARY OF THE INVENTION

The present invention is directed to a method and apparatus for making borehole temperature measurements. More particularly, a wireless, self-contained temperature sensor is programmed to record and store temperature data at predetermined times during operations within a borehole penetrating a subsurface formation. The programmed temperature sensor is placed in a pressure housing capable of withstanding borehole pressures. The pressure housing is affixed to a borehole tool. The borehole tool, containing the programmed temperature sensor, is positioned in a borehole and temperature data is recorded at the predetermined times as programmed into the temperature sensor. The depth of the temperature sensor within the borehole corresponding with each temperature reading is recorded. Thereafter, the borehole tool is removed from the borehole and the temperature sensor is removed from the pressure housing. The borehole recorded temperature data stored within the temperature sensor is retrieved and a record is created of borehole temperature versus depth within the borehole at the programmed times.

During borehole drilling operations the temperature sensor may be programmed to record and store temperature data as the drilling tool is lowered down a borehole, to record static mud temperature as the drilling tool approaches the bottom of the borehole hole, to record circulating mud temperature at the bottom of the borehole before drilling, to record borehole bottom temperature during drilling as the drill bit augers through the subsurface formation at the bottom of the borehole, to record circulating mud temperature at the bottom of the borehole after drilling, and to record temperature data as the drilling tool is raised out of the borehole after drilling. Further, in conjunction with borehole completion operations, the programmed temperature sensor may be used to record temperature data as a borehole tool traverses a well following cementation operations to identify the top of a cement column in an annulus between casing liner and borehole wall.

Apparatus for housing the temperature sensor includes a generally hollow cylindrical housing closed at a first end and open at a second end for insertion of the temperature sensor, the housing protecting the temperature sensor from borehole pressures. The temperature sensor is maintained in position within the portion of the housing adjacent the first end of the housing by a circumferential slot around the inner surface of the housing at a point beyond which the temperature sensor is to be inserted and a retaining ring inserted into the circumferential slot. O-rings support the temperature sensor within the housing and provide for a shock absorbing effect on the temperature sensor from pressure applied by the retaining ring. The housing further includes internal threads along a portion of the housing adjacent the second end of the housing for threadably securing the housing into a borehole tool.

DESCRIPTION OF THE PREFERRED EMBODIMENT

Figure 1:
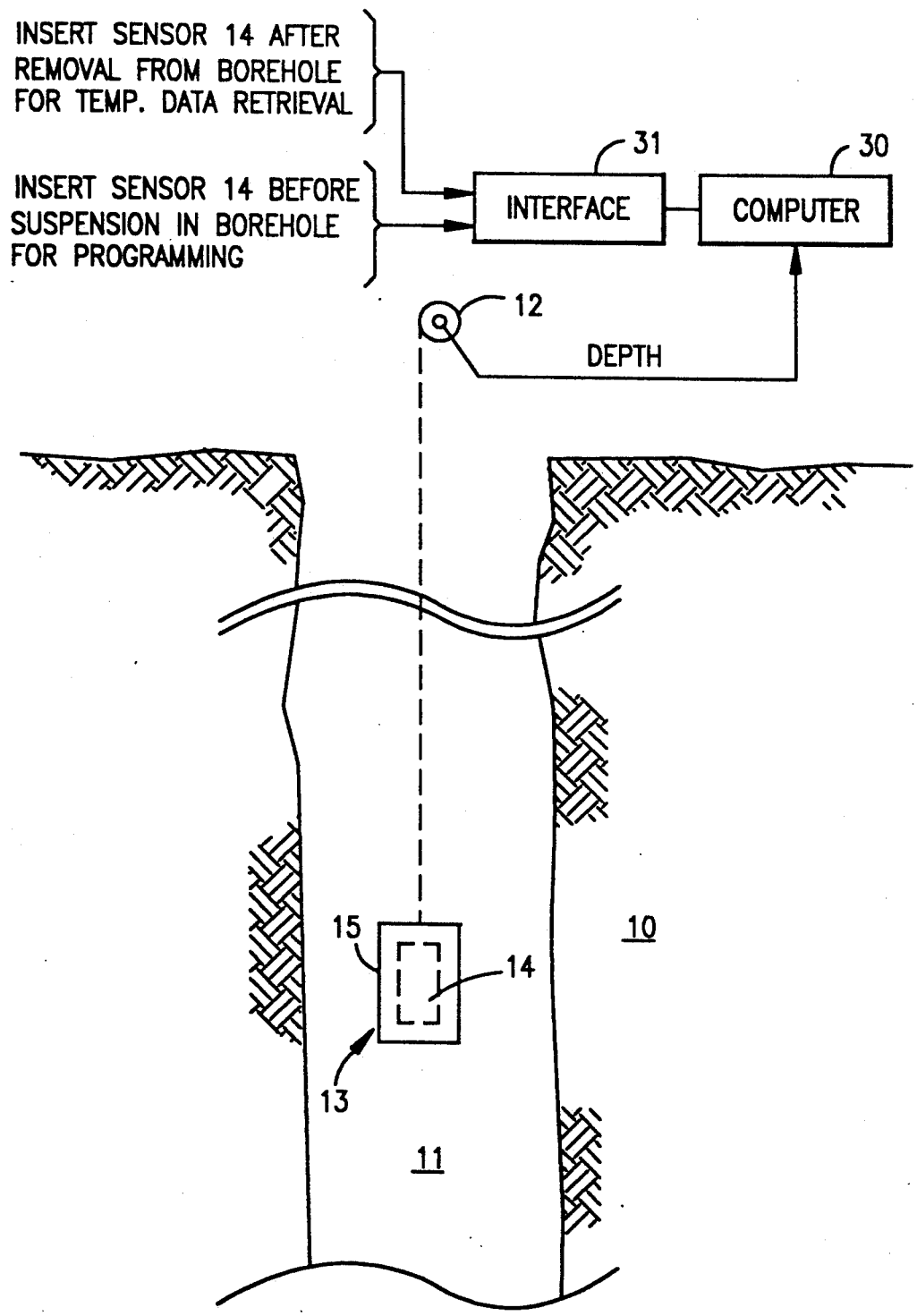
FIG. 1 illustrates in pictorial form a borehole temperature measuring system employing the borehole temperature sensor assembly of the present invention.

Referring to FIG. 1, there is illustrated a subsurface formation 10 penetrated by a borehole 11. A pressure housing 15 is suspended within the borehole 11 and includes a borehole temperature sensor assembly 13 for carrying out temperature measurements during a borehole operation. Assembly 13 comprises a wireless, self-contained programmable temperature sensor 14 positioned within the pressure housing 15 as will be more fully described in conjunction with FIG. 2.

The assembly 13 may be positioned anywhere along the borehole 11 in accordance with the desired borehole operation to be carried out. The temperature sensor 14 has a self-contained memory that is programmed on the surface of the earth to record and store temperature data at predetermined times during a borehole operation. It is then inserted into the pressure housing 15 which protects the sensor 14 up to borehole pressures of 20,000 psi. Suitable depth recording means such as sheave 12 also records the depth of the temperature sensor 14 corresponding with the temperature recordings. After the borehole operation is completed, the borehole tool is removed from the borehole and the temperature sensor 14 is removed from the pressure housing 15. Stored temperature data is then retrieved from the self-contained memory of temperature sensor 14 and is used to create a record of borehole temperature versus depth within the borehole at the programmed recording times. A suitable wireless, self-contained programmable temperature sensor is the Micropack unit supplied by Datatrace, a division of Mesa Medical, Inc., 3904 Youngfield Street, Wheat Ridge, Colo., 80033. When the Micropack unit is linked with a suitable personal computer 30 by an interface unit 31, such as the PC Interface System (RS-232-C) supplied by Datatrace, and an interface cable 32 the personal computer becomes a programming and temperature data retrieval workstation. Through the computer an operator programs the temperature sensor on the surface of the earth for start time and sample intervals. Following a borehole operation, the temperature sensor is removed from the borehole to the surface of the earth where it is again linked with the PC Interface for temperature data retrieval.

In carrying out borehole temperature measurements in accordance with the present invention, the temperature sensor 14 may be programmed to record and store temperature data as the borehole tool is moved or traverses a plurality of positions along the borehole during any of several different borehole operations. For example, temperature readings may be desired throughout a borehole drilling operation. In this instance, the borehole temperature sensor assembly 13 can be affixed to the drilling tool in juxtaposition above the drill bit. The temperature sensor 14 can be programmed to record and store temperature at programmed times to record (i) borehole temperature during the lowering of the drill bit down the borehole, (ii) static mud temperature as the drill bit approaches the bottom of the borehole, (iii) circulating mud temperature at the bottom of the borehole before drilling, (iv) borehole bottom temperature during drilling as the drill bit augers through the subsurface formation at the bottom of the borehole, (v) circulating mud temperature at the bottom of the borehole after drilling, and (vi) borehole temperature as the drilling tool is raised out of the borehole.

In a further example, the borehole temperature sensor assembly 13 may be traversed along the borehole to obtain borehole temperature measurements for use in assisting a well casing operation. Casing a well consists of lowering casing (pipe) sections into the well from top to bottom. A cement slurry is pumped down the inside of the casing and forced up the annulus between the casing and the borehole wall. This seals the casing joints from the surrounding formation. In a good cement job the cement flows to the surface through such annulus before setting up. In a bad cement job, if the cement runs too cold, it may not set up. If the cement is too hot, it sets up too soon and the well may plug off before the cement slurry is all pumped away. Therefore, borehole temperature measurements will aide in the design of the correct cement slurry and can be made as the borehole tool is being pulled out of the borehole following drilling or before casing installation by being lowered into the borehole on a logging cable. After the well casing operation is complete, the temperature measurements can be made by lowering the sensor assembly 13 on a logging cable to aide in identifying the top of the cement column in the annulus between the casing liner and the borehole wall.

Sensor assembly 13 can be used in any number of logging operations. While a conventional temperature measurement from logging tools is a single point that defines the highest temperature observed during the logging operation, use of the sensor assembly 13 will provide a profile of well temperature illustrating the location and duration of the high temperature.

Figure 2:
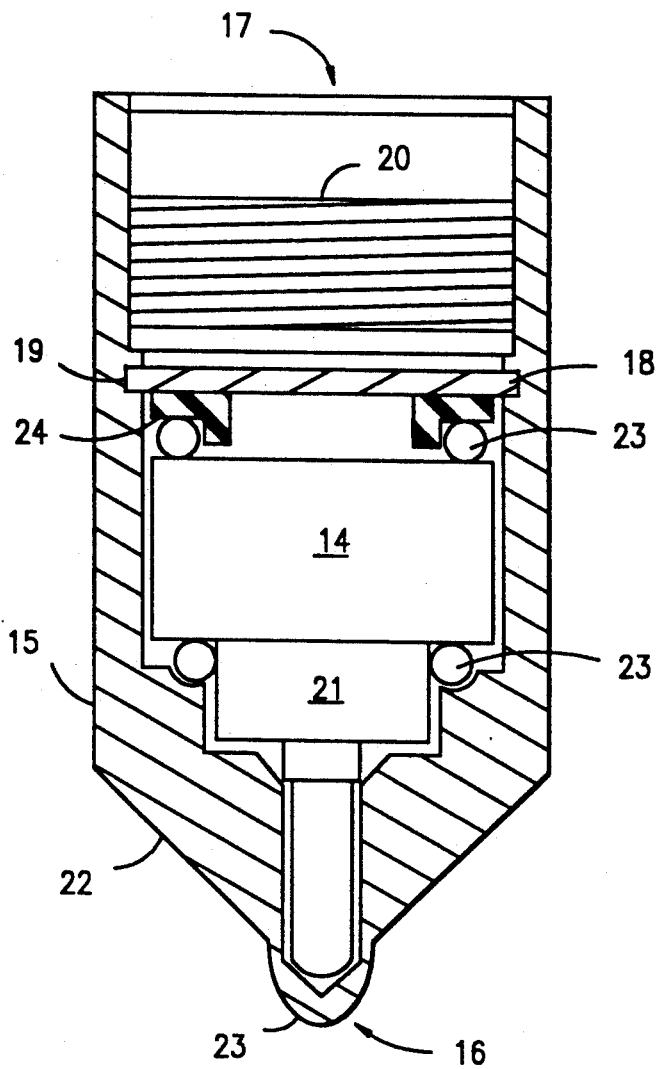
FIG. 2 is a cross-sectional view of the borehole temperature sensor assembly of FIG. 1.
Figure 3:
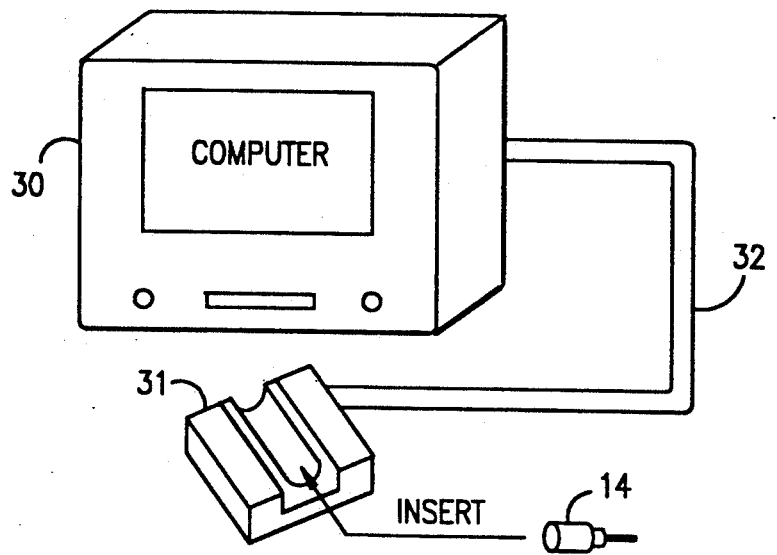
FIG. 3 is a pictorial schematic of the temperature sensor programming and data retrieval portion of the system of FIG. 1.

Referring now to FIG. 2 there is illustrated in detail the sensor assembly 13 Pressure housing 15, shown in cross-section, is a generally hollow cylindrical member closed at a first end 16 and open at a second end 17 for the insertion of temperature sensor 14. Temperature sensor is positioned within that portion of the housing 15 adjacent the first end 16. A retaining ring 18 snaps into a circumferential slot 19 in the inner surface of housing 15 to maintain the temperature sensor 14 in its fully inserted position adjacent closed end 16. With ring 18 snapped in position, temperature sensor 14 is maintained in a secure position within housing 15 by the force of ring 1 against the washer 24 and the pair of O-rings 23. Thus, O-rings 23 support the temperature sensor 14 within the housing 15 and provide for a shock absorbing effect on the temperature sensor 14 within housing 15 to prevent it from being damaged during installation, deployment and retrieval. Internal threads 20 are included in the inner surface of housing 15 along a portion of such housing adjacent open end 17. Various configurations of tops (not shown) may be screwed into end 17 by way of threads 20 so as to secure the sensor assembly 13 to a particular configuration of borehole tool, such as a drilling tool, logging tool, etc.

The temperature sensor 14 includes a temperature sensing probe 21 extending outward from the body of sensor 14. The end 16 of housing 15 is tapered at 22 and rounded at 23. Probe 21 extends into such tapered and rounded end so as to minimize the amount of housing between the probe 21 and the borehole environment, thereby enhancing the temperature measurements. The material comprising the housing 15 further is selected so as to minimize heat conduction time between the borehole environment and the temperature sensor probe 21. Preferably such material is comprised of 17-4 PH stainless steel for strength.

Having now described the present invention in conjunction with a preferred embodiment, it is to be understood that various modifications or changes may be made without departing from the spirit and scope of the invention as set forth in the appended claims.

I claim:

1. A method for making borehole temperature measurements, comprising the steps of:
    a) programming a self-contained, programmable temperature sensor on the surface of the earth to record and store temperature data at predetermined times when operating within a borehole penetrating a subsurface formation,
    b) placing said programmed temperature sensor into a pressure housing capable of withstanding borehole pressures,
    c) suspending said pressure housing containing said programmed temperature sensor within said borehole,
    d) positioning said pressure housing containing said programmed temperature sensor along said borehole for the recording and storing of borehole temperature data,
    e) recording and storing temperature data within said temperature sensor during operation of said temperature sensor within said borehole at said predetermined times as programmed into said temperature sensor, f) recording the depth of said temperature sensor within said borehole corresponding with each temperature recording, g) removing said pressure housing from said borehole to the earth's surface, h) removing said temperature sensor from said pressure housing, and i) retrieving said borehole recorded temperature data stored within said temperature sensor and creating a record of borehole temperature versus depth within said borehole at said predetermined times.

2. The method of claim 1 further comprising the step of affixing said pressure housing containing said programmed temperature sensor in axial position along a borehole drilling tool.

3. The method of claim 2 further comprising the step of affixing said pressure housing containing said programmed temperature sensor in juxtaposition above a drill bit in a borehole drilling tool.

4. The method of claim 3 further comprising the step of recording temperature with said temperature sensor programmed to record borehole temperature as said drilling tool is being lowered down the borehole.

5. The method of claim 3 further comprising the step of recording temperature with said temperature sensor programmed to record static mud temperature as said drilling tool approaches the bottom of the borehole.

6. The method of claim 3 further comprising the step of recording temperature with said temperature sensor programmed to record circulating mud temperature at the bottom of the borehole before drilling.

7. The method of claim 3 further comprising the step of recording temperature with said temperature sensor programmed to record borehole bottom temperature during drilling as said drill bit augers through the subsurface formation at the bottom of the borehole.

8. The method of claim 3 further comprising the step of recording temperature with said temperature sensor programmed to record circulating mud temperature at the bottom of the borehole after drilling.

9. The method of claim 3 further comprising the step of recording temperature with said temperature sensor programmed to record temperature as said drilling tool is being raised out of said borehole.

10. The method of claim 1 further comprising the step of affixing said pressure housing in axial position along a borehole logging tool.

11. The method of claim 10 further comprising the step of recording temperature with said temperature sensor programmed to record temperature with said logging tool positioned at a plurality of points along said borehole.

12. The method of claim 10 further comprising the step of recording temperature with said temperature sensor programmed to record temperature as said borehole logging tool traverses said borehole.

13. The method of claim 12 wherein said borehole logging tool traverses a cased borehole to record temperature data for identifying the top of a cement column in an annulus between casing liner and borehole wall.

14. Apparatus for making borehole temperature measurements, comprising:

a) a self-contained programmable temperature sensor, b) means positioned on the surface of the earth for programming said temperature sensor for the recording and storing of borehole temperature data at predetermined times during a borehole operation, c) a generally hollow cylindrical pressure housing into which said temperature sensor is inserted after having been programmed to record and store said borehole temperature data, said housing protecting said temperature sensor from borehole pressure, d) means for positioning said pressure housing containing said temperature sensor within said borehole for the recording and storing of temperature data as programmed into said temperature sensor on the surface of the earth, e) means for recording the depth of said temperature sensor within said borehole corresponding with each temperature recording, f) means for removing said pressure housing containing said temperature sensor from said borehole to the surface of the earth, and g) means positioned on the surface of the earth for retrieving temperature data stored in said temperature sensor and recording said temperature data versus depth within said borehole.

15. The apparatus of claim 14 wherein said pressure housing includes internal threads along a portion of said pressure housing said positioning means.

16. A pressure housing for a self-contained borehole temperature sensor comprising:

a) a generally hollow cylindrical pressure housing closed at a first end and open at a second end for insertion of said temperature sensor, b) a circumferential slot around the inner surface of said housing at a point beyond which said temperature sensor is inserted, and c) a retaining ring inserted into said circumferential slot around the inner surface of said housing for maintaining said temperature sensor in position within the portion of said pressure housing adjacent said first end of said pressure housing.

17. The apparatus of claim 16 further comprising O-rings positioned between said temperature sensor and said retaining ring for supporting said temperature sensor within said housing and for providing a shock absorbing effect on said temperature sensor from pressure applied by said retaining ring.

18. The apparatus of claim 14 wherein said housing protects said temperature sensor from pressures up to 20,000 psi.

19. The apparatus of claim 14 wherein:

a) said temperature sensor includes a temperature sensing probe extending outward from the body of said sensor, and b) one end of said pressure housing is terminated in a rounded protrusion, said sensor being inserted into said housing such that said temperature sensing probe protrudes into said rounded protrusion of said end of said pressure housing, thereby minimizing the amount of said pressure housing between said temperature sensing probe and said borehole.

20. The apparatus of claim 19 wherein at least the rounded protrusion of said end of said pressure housing comprises a material which minimizes heat conduction time between the borehole and said temperature sensing probe.

21. The apparatus of claim 20 wherein said material comprises stainless steel.

* * * * *

UNITED STATES PATENT AND TRADEMARK OFFICE
CERTIFICATE OF CORRECTION

PATENT NO. : 5,136,525

DATED : August 4, 1992

INVENTOR(S) : Wayne B. Cloud

It is certified that error appears in the above-identified patent and that said Letters Patent is hereby corrected as shown below:

Column 6, line 25, after "housing" insert --for threadably securing said pressure housing to --

Signed and Sealed this

Thirty-first Day of August, 1993

Attest:

BRUCE LEHMAN

Attesting Officer

Commissioner of Patents and Trademarks